United States Patent
Sethi et al.

(10) Patent No.: US 12,363,162 B2
(45) Date of Patent: *Jul. 15, 2025

(54) END-TO-END TCP MONITORING DURING APPLICATION MIGRATION

(71) Applicant: Dell Products L.P., Round Rock, TX (US)

(72) Inventors: Parminder Singh Sethi, Punjab (IN); Shelesh Chopra, Bangalore (IN); Anay Kishore, Bangalore (IN); Atishay Jain, Meerut (IN)

(73) Assignee: Dell Products L.P., Round Rock, TX (US)

( * ) Notice: Subject to any disclaimer, the term of this patent is extended or adjusted under 35 U.S.C. 154(b) by 199 days.

This patent is subject to a terminal disclaimer.

(21) Appl. No.: 18/453,673

(22) Filed: Aug. 22, 2023

(65) Prior Publication Data

US 2025/0071142 A1    Feb. 27, 2025

(51) Int. Cl.
*H04L 9/40*    (2022.01)
*H04L 69/16*    (2022.01)

(52) U.S. Cl.
CPC ...... *H04L 63/1458* (2013.01); *H04L 63/0245* (2013.01); *H04L 63/0428* (2013.01); *H04L 63/1416* (2013.01); *H04L 69/16* (2013.01)

(58) Field of Classification Search
CPC ... H04L 9/40; H04L 63/1458; H04L 63/0245; H04L 63/0428; H04L 63/1416; H04L 69/16
See application file for complete search history.

(56) References Cited

U.S. PATENT DOCUMENTS

| | | | | |
|---|---|---|---|---|
| 8,429,751 | B2* | 4/2013 | Mizrahi | H04L 63/168 |
| | | | | 709/227 |
| 8,856,869 | B1* | 10/2014 | Brinskelle | H04L 63/0823 |
| | | | | 726/2 |
| 9,195,573 | B1* | 11/2015 | Giammaria | G06F 11/3688 |
| 9,253,159 | B2* | 2/2016 | Chauhan | H04L 67/141 |
| 9,282,097 | B2* | 3/2016 | Agarwal | G06F 21/41 |
| 9,461,996 | B2* | 10/2016 | Hayton | G06F 21/00 |
| 9,613,190 | B2* | 4/2017 | Ford | H04L 63/083 |
| 9,906,559 | B2* | 2/2018 | Cudak | H04L 67/10 |
| 10,048,996 | B1* | 8/2018 | Bell | G06F 11/3006 |
| 10,116,681 | B2* | 10/2018 | Cornell | G06Q 10/06 |

(Continued)

*Primary Examiner* — Jayesh M Jhaveri
(74) *Attorney, Agent, or Firm* — Chamberlain, Hrdlicka, White, Williams & Aughtry; Aly Z. Dossa

(57) ABSTRACT

A method for performing an application migration operation includes initiating the application migration operation to migrate an application from a source device to a target device, where the source device includes a source data migration agent and the target device comprises a target data migration agent. The method also includes initiating an active scan of network traffic at a transmission control protocol layer. The method further includes establishing a secure data path between the source device and the target device. In addition, the method includes beginning migration of the application from the source device to the target device using the secure data path. Moreover, the method includes making a first determination, using the active scan, that a data packet is associated with suspicious activity and rejecting the data packet based on the first determination.

20 Claims, 6 Drawing Sheets

(56) References Cited

U.S. PATENT DOCUMENTS

| | | | |
|---|---|---|---|
| 10,318,964 B2* | 6/2019 | Shaw | G06F 16/26 |
| 10,616,263 B1* | 4/2020 | Wells | H04L 63/1433 |
| 10,620,947 B2* | 4/2020 | Gavisiddappa Kodigenahalli | H04L 67/34 |
| 10,885,187 B1* | 1/2021 | Djerbaka | G06F 16/183 |
| 11,263,295 B2* | 3/2022 | Korotaev | H04L 63/1491 |
| 11,314,874 B2* | 4/2022 | Dande | G06N 20/00 |
| 11,599,645 B2* | 3/2023 | Waplington | G06F 21/54 |
| 11,704,412 B2* | 7/2023 | Moriarty | H04L 63/1433 726/25 |
| 11,711,401 B2* | 7/2023 | Solari | H04W 12/06 726/3 |
| 12,034,740 B1* | 7/2024 | Carmack | H04L 63/1416 |
| 2005/0195975 A1* | 9/2005 | Kawakita | H04L 9/3236 380/30 |
| 2007/0005985 A1* | 1/2007 | Eldar | G06Q 20/3674 713/183 |
| 2007/0180509 A1* | 8/2007 | Swartz | G06F 21/575 726/9 |
| 2009/0083443 A1* | 3/2009 | Ocko | G06F 11/2097 709/248 |
| 2010/0138926 A1* | 6/2010 | Kashchenko | G06F 21/74 726/25 |
| 2011/0296025 A1* | 12/2011 | Lieblich | G06F 9/5072 709/226 |
| 2012/0303739 A1* | 11/2012 | Ferris | H04L 9/40 709/224 |
| 2013/0074181 A1* | 3/2013 | Singh | H04L 41/0668 726/22 |
| 2013/0227352 A1* | 8/2013 | Kumarasamy | G06F 11/3006 714/47.1 |
| 2016/0154690 A1* | 6/2016 | Horrell | G06N 5/02 714/57 |
| 2017/0251013 A1* | 8/2017 | Kirti | H04L 63/1441 |
| 2018/0143880 A1* | 5/2018 | Dornemann | G06F 11/2048 |
| 2019/0108340 A1* | 4/2019 | Bedhapudi | G06F 21/554 |
| 2019/0332496 A1* | 10/2019 | Chopra | G06F 11/1461 |
| 2020/0019465 A1* | 1/2020 | Khan | G06F 16/188 |
| 2020/0128039 A1* | 4/2020 | Jalan | H04L 63/101 |
| 2022/0108167 A1* | 4/2022 | Upadhyay | G06F 3/061 |
| 2022/0182360 A1* | 6/2022 | Levin | H04L 63/029 |
| 2024/0028387 A1* | 1/2024 | Sethi | G06F 9/4856 |
| 2024/0330443 A1* | 10/2024 | Sethi | G06F 21/554 |
| 2024/0333697 A1* | 10/2024 | Sethi | H04L 63/08 |
| 2025/0023714 A1* | 1/2025 | Kumar | H04L 9/0819 |
| 2025/0071139 A1* | 2/2025 | Sethi | H04L 63/1433 |
| 2025/0071142 A1* | 2/2025 | Sethi | H04L 63/1458 |

* cited by examiner

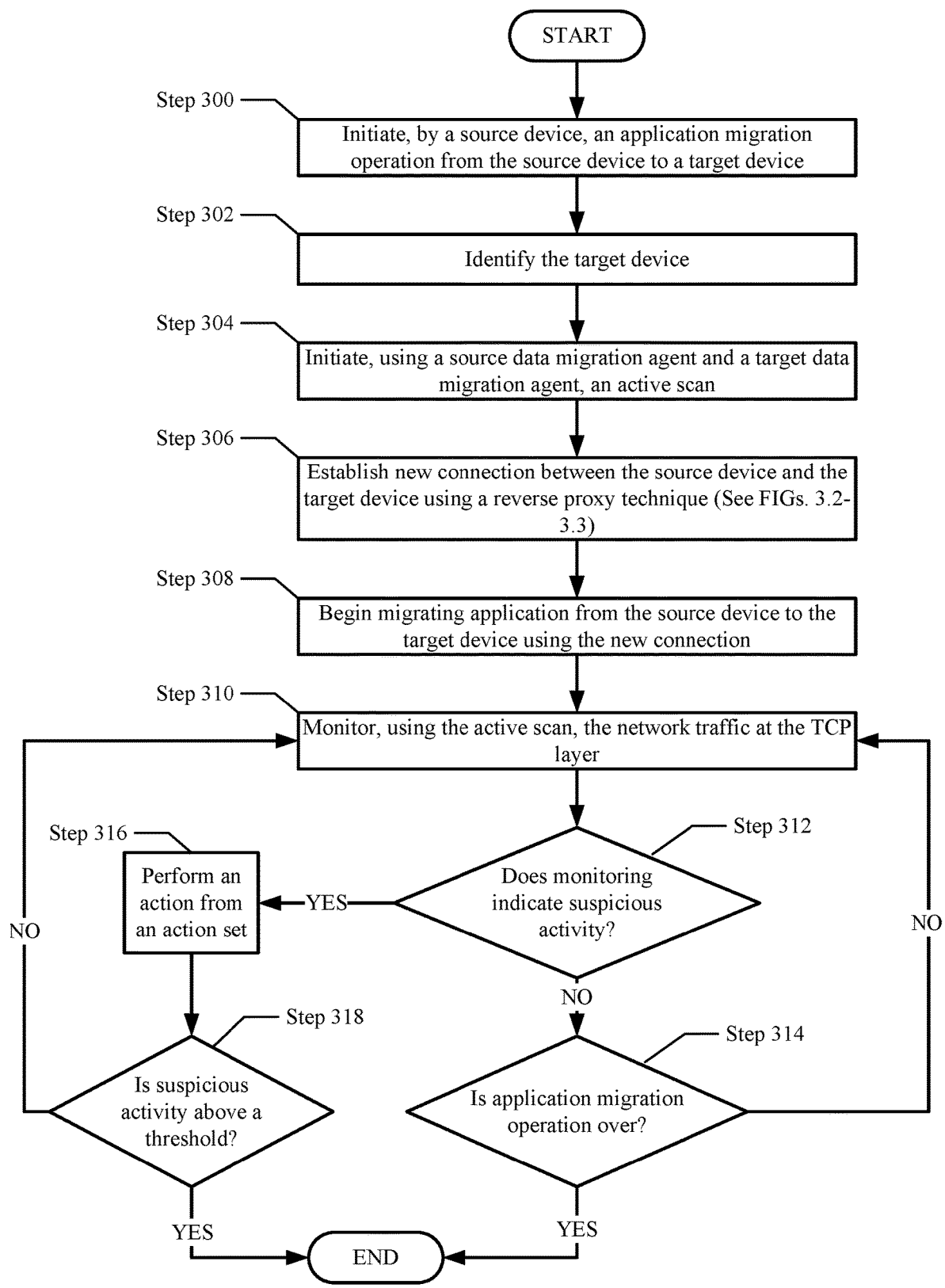
FIG 3.1

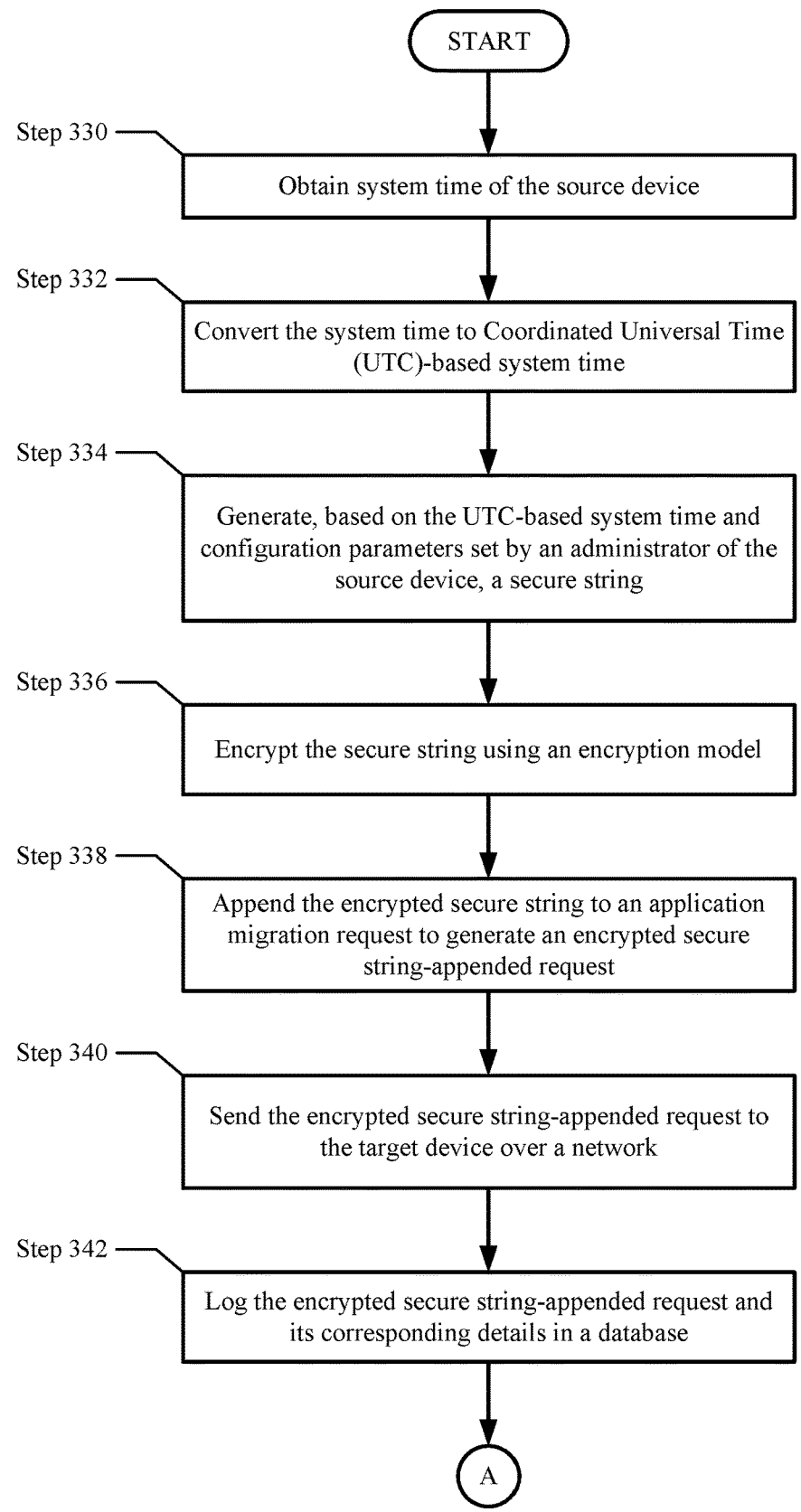
FIG. 3.2

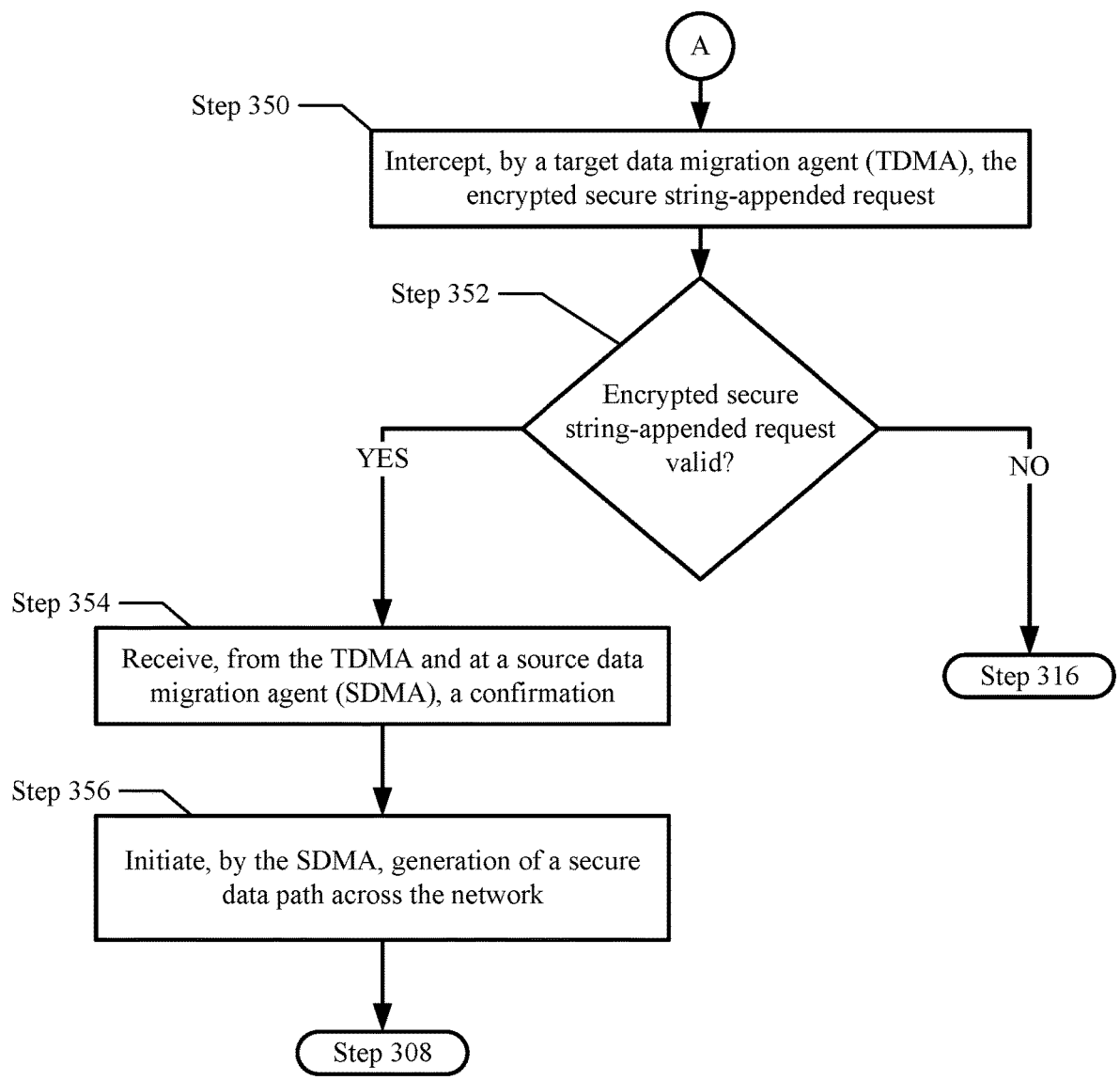
FIG 3.3

END-TO-END TCP MONITORING DURING APPLICATION MIGRATION

BACKGROUND

Computing devices may provide services. To provide the services, the computing devices may include hardware components and software components. The software components may store information usable to provide the services using the hardware components. From time-to-time, data may be migrated from one device to another device. Such migrating may present an opportunity for a bad actor to perform inappropriate actions on the data being migrated.

SUMMARY

In general, embodiments described herein relate to a method for performing an application migration operation, the method includes initiating the application migration operation to migrate an application from a source device to a target device, where the source device includes a source data migration agent (SDMA) and the target device comprises a target data migration agent (TDMA). The method also includes initiating an active scan of network traffic at a transmission control protocol (TCP) layer. The method further includes establishing a secure data path between the source device and the target device by: obtaining, by the SDMA in response to the initiation of the active scan, coordinated universal time (UTC)-based system time of the source device; generating, by the SDMA, a secure string based on the coordinated UTC-based system time and a configuration parameter set by a user of the source device; encrypting, by the SDMA, the secure string to generate an encrypted secure string; appending, by the SDMA, the encrypted secure string to an application migration notification to generate an encrypted secure string-appended request; sending, by the SDMA, the encrypted secure string-appended request to the TDMA; receiving, from the TDMA, a confirmation that the encrypted secure string-appended request was properly received; and initiating, by the SDMA and based on the first confirmation, the secure data path from the source device to the target device. In addition, the method includes beginning migration of the application from the source device to the target device using the secure data path. Moreover, the method includes making a first determination, using the active scan, that a data packet is associated with suspicious activity, and the first determination is based on at least one of the following: making a second determination that the data packet includes a structural abnormality, making a third determination that the data packet is indicative of a distributed denial-of-service (DDOS) attack, and making a fourth determination that the data packet includes an irrelevant flag. Also, the method includes rejecting the data packet based on the first determination, logging information about the data packet, making a fifth determination that the application migration operation is complete, and terminating the active scan and the secure data path based on the fifth determination.

In general, embodiments described herein relate to a method for performing an application migration operation, the method includes initiating the application migration operation to migrate an application from a source device to a target device, where the source device includes a source data migration agent (SDMA) and the target device comprises a target data migration agent (TDMA). The method also includes initiating an active scan of network traffic at a transmission control protocol (TCP) layer. The method further includes establishing a secure data path between the source device and the target device by: obtaining, by the SDMA in response to the initiation of the active scan, coordinated universal time (UTC)-based system time of the source device; generating, by the SDMA, a secure string based on the coordinated UTC-based system time and a configuration parameter set by a user of the source device; encrypting, by the SDMA, the secure string to generate an encrypted secure string; appending, by the SDMA, the encrypted secure string to an application migration notification to generate an encrypted secure string-appended request; sending, by the SDMA, the encrypted secure string-appended request to the TDMA; receiving, from the TDMA, a confirmation that the encrypted secure string-appended request was properly received; and initiating, by the SDMA and based on the first confirmation, the secure data path from the source device to the target device. In addition, the method includes beginning migration of the application from the source device to the target device using the secure data path. Moreover, the method includes making a first determination, using the active scan, that a data packet is associated with suspicious activity and rejecting the data packet based on the first determination.

In general, embodiments described herein relate to a non-transitory computer readable medium including computer readable program code, which when executed by a computer processor enables the computer processor to perform a method for performing an application migration operation. The method includes initiating the application migration operation to migrate an application from a source device to a target device, where the source device includes a source data migration agent (SDMA) and the target device comprises a target data migration agent (TDMA). The method also includes initiating an active scan of network traffic at a transmission control protocol (TCP) layer. The method further includes establishing a secure data path between the source device and the target device by: obtaining, by the SDMA in response to the initiation of the active scan, coordinated universal time (UTC)-based system time of the source device; generating, by the SDMA, a secure string based on the coordinated UTC-based system time and a configuration parameter set by a user of the source device; encrypting, by the SDMA, the secure string to generate an encrypted secure string; appending, by the SDMA, the encrypted secure string to an application migration notification to generate an encrypted secure string-appended request; sending, by the SDMA, the encrypted secure string-appended request to the TDMA; receiving, from the TDMA, a confirmation that the encrypted secure string-appended request was properly received; and initiating, by the SDMA and based on the first confirmation, the secure data path from the source device to the target device. In addition, the method includes beginning migration of the application from the source device to the target device using the secure data path. Moreover, the method includes making a first determination, using the active scan, that a data packet is associated with suspicious activity and rejecting the data packet based on the first determination.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 3.1-3.3 show a method for providing a secure application migration operation in accordance with one or more embodiments.

DETAILED DESCRIPTION

Figure 1:
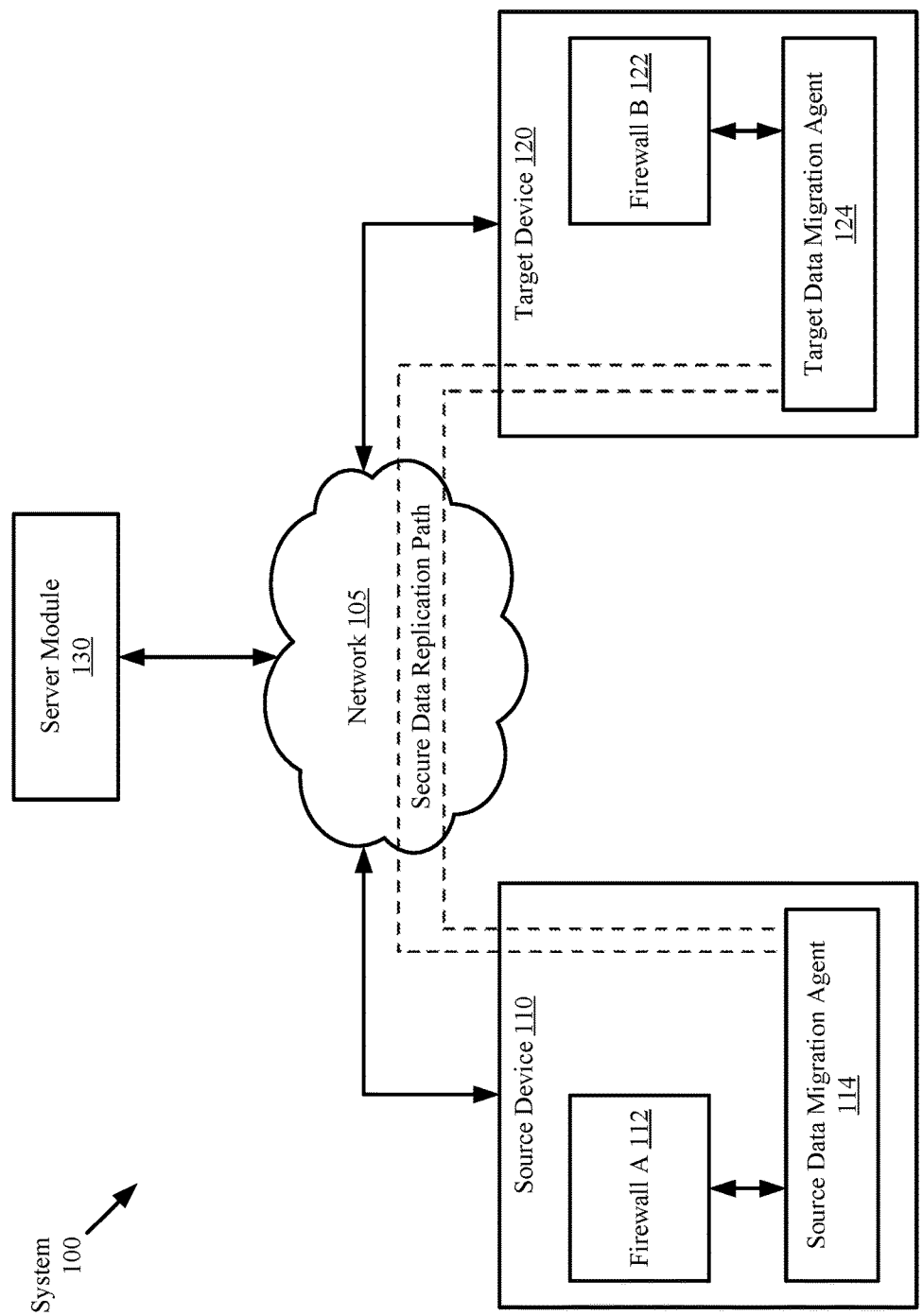
FIG. 1 shows a diagram of a system in accordance with one or more embodiments.

In the below description, numerous details are set forth as examples of embodiments described herein. It will be understood by those skilled in the art, and having the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to methods, systems and non-transitory computer readable mediums storing instructions for creating and executing application migration operations from one device or set of devices to another device or set of devices (e.g., from one computing environment to another). In one or more embodiments, migration operations include providing additional safety during the data migration operation.

In one or more embodiments, a data migration agent may be included on both a source device and a target device to monitor a data migration operation. The data migration agent(s) may identify the source device and the target device, where the source device is intending to migrate an application to the target device. The data migration agent(s) may monitor network traffic to the target device and from the source device at a transmission control protocol (TCP) level to validate the migration of the application from the source device to the target device. While monitoring the migration of the application, the data migration agent(s) may encounter one or more calls that are deemed abnormal or invalid for one or more reasons. Such calls are rejected by the data migration agent(s) and the rejection is logged. In addition, the data migration agent(s) may log certain other details about the calls, such as media access control (MAC) address and/or internet protocol (IP) address to reject further calls associated with the MAC address and/or IP address, thereby reducing or preventing distributed denial-of-service (DDOS) attacks. Doing so may increase the safety provided for the data being migrated during an application migration operation, thereby reducing the ability of a bad actor to perform actions on data.

The following describes various embodiments of the invention.

FIG. 1 shows a diagram of a system (100) in accordance with one or more embodiments. The system (100) includes a source device (110), a target device (120), a server module (130), and a network (105). The system (100) may include additional, fewer, and/or different components without departing from the scope of the embodiments disclosed herein. Each component may be operably connected to any of the other components via any combination of wired and/or wireless connections. Each component illustrated in FIG. 1 is discussed below.

In one or more embodiments, the source device (110), the target device (120), the server module (130), and the network (105) may be physical or logical devices, as discussed below. Source device (110) may be operably connected to target device (120) via the network (105), in which the network (105) may allow the source device (110) (e.g., components of source device (110)) to communicate with target device (120) (e.g., components of target device (120)). In one or more embodiments, Firewall A (112) and source data migration agent (114) may collectively be referred to as "components of source device (110)". Similarly, in one or more embodiments, Firewall B (122) and target data migration agent (124) may collectively be referred to as "components of target device (120)".

While FIG. 1 shows a specific configuration of the system (100), other configurations may be used without departing from the scope of the invention. For example, although source device (110) and target device (120) are shown to be operatively connected through the network (105), source device (110) and target device (120) may be directly connected, without an intervening network (e.g., 105). Further, source device (110) and target device (120) may include any further number of devices that each include the components illustrated in FIG. 1.

In one or more embodiments, as being a physical computing device or a logical computing device (e.g., a VM), the source device (110) and/or the target device (120) may be configured for hosting and maintaining various workloads, and/or for providing a computing environment (e.g., computing power and storage) whereon workloads may be implemented. Further, in one or more embodiments, the source device (110) and/or the target device (120) are data centers. In general, a data center's (e.g., a site's, a node's, etc.) infrastructure is based on a network of computing and storage resources that enable the delivery of shared applications and data. For example, a data center of an organization may exchange data with other data centers of the same organization registered in/to the network (105) in order to, for example, participate in a collaborative workload placement. As yet another example, a data center may split up a request (e.g., an operation, a task, an activity, etc.) with another data center, coordinating its efforts to complete the request (e.g., to generate a response) more efficiently than if the data center had been responsible for completing the request.

As used herein, "network traffic" is an amount of data moving across a network (e.g., 105) at any given time. For example, in search engine optimization, network traffic may be characterized as being either direct, organic, or paid, in which (i) direct network traffic may be initiated when a user types a website's uniform resource locator (URL) in a web browser (e.g., a computer program for displaying and navigating between web pages), (ii) organic network traffic may be initiated when a user uses a search engine of a web browser to locate information in web pages, and (iii) paid network traffic may be initiated when a user clicks on an advertisement on a web page.

As yet another example, network traffic may be characterized as either being north-south or east-west, in which (i) north-south network traffic may be client-to-server network traffic that operates between a client and a server and (ii) east-west network traffic may be server-to-server network traffic that operates between servers within a data center.

In one or more embodiments, the source device (110) and/or the target device (120) may include, for example (but not limited to): a router, a switch, a firewall, a security module, a storage infrastructure, a server, an application-delivery controller, a network device, etc. The source device (110) and/or the target device (120) may support business applications and activities (e.g., actions, behaviors, etc.) that include, for example (but not limited to): email and asset (e.g., a file, a folder, etc.) sharing, one or more production workloads, customer relationship management, enterprise resource planning, artificial intelligence (AI)/machine learning (ML)-based activities, virtual desktop infrastructure (VDI) environments, collaboration services, etc.

Figure 4:
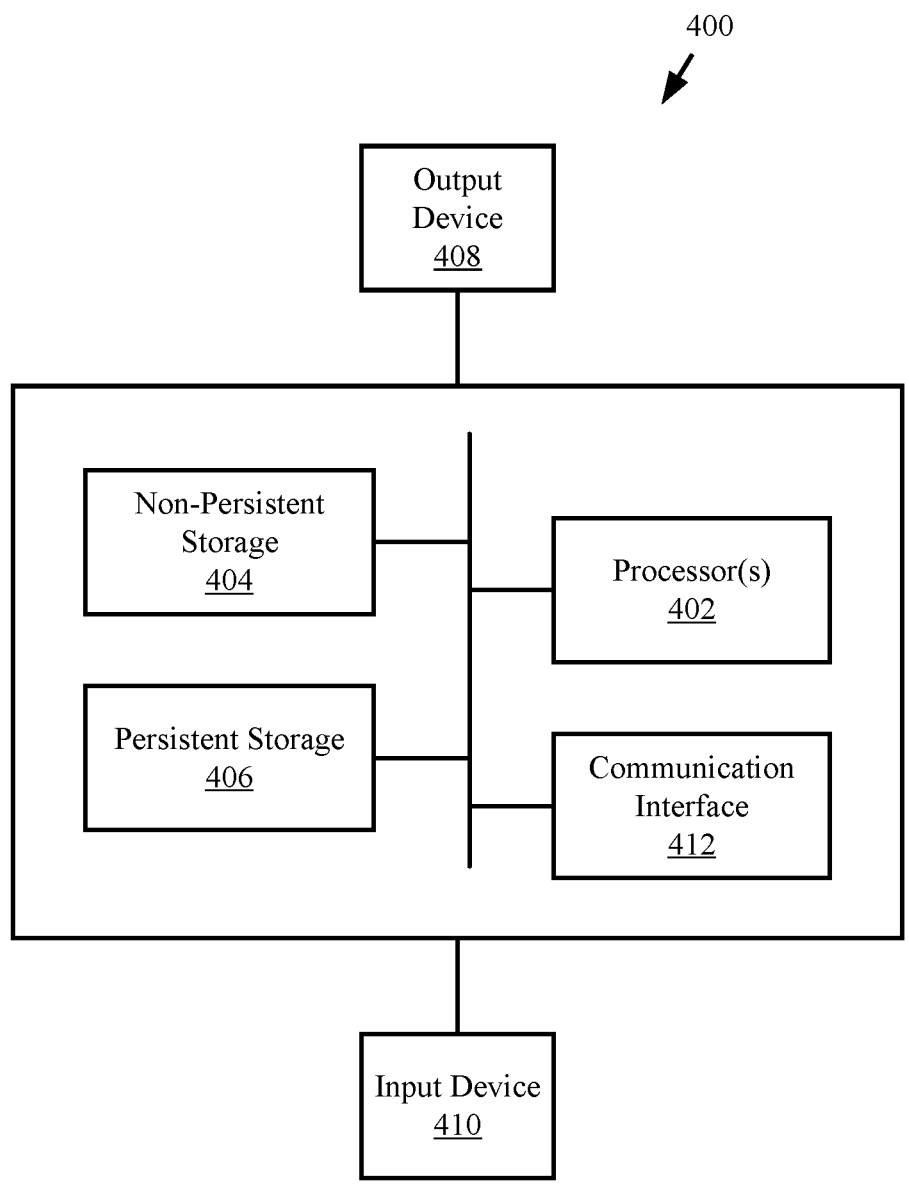
FIG. 4 shows a diagram of a computing device in accordance with one or more embodiments.

In one or more embodiments, the source device (110), the target device (120) and/or the server module (130) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device cause the computing device to perform the functionality of the data center described throughout this application.

Alternatively, in one or more embodiments, the source device (110), the target device (120) and/or the server module (130) may be implemented as a logical device. The logical device may utilize the computing resources of any number of computing devices to provide the functionality of the source device (110), the target device (120) and/or the server module (130) described herein.

In one or more embodiments, the source device (110) and/or the target device (120) may include any number of applications (and/or content accessible through the applications) that provide computer-implemented application services to the users. Application services may include, for example (but not limited to): database services, electronic communication services, instant messaging services, file storage services, web-based services, desktop-based services, workload placement collaboration services, serving (e.g., processing) a request, sharing an application log, receiving computing resource details of a node, transmitting a request, analyzing data, streaming video, etc. In order to provide the aforementioned application services, each application may host similar or different components. The components may be, for example (but not limited to): instances of databases, instances of email servers, etc. Applications may be executed on the clients as instances of an application.

Further, applications may vary in different embodiments, but in certain embodiments, applications may be custom developed or commercial (e.g., off-the-shelf) applications that a user desires to execute in the source device (110) and/or the target device (120). In one or more embodiments, applications (e.g., a word processor, a media player, a web browser, a file viewer, an image editor, etc.) may be (i) designed and configured to perform one or more functions instantiated by a user and (ii) logical entities executed using computing resources of a client. For example, applications may be implemented as computer instructions, e.g., computer code, stored on persistent storage of the source device (110) and/or the target device (120) that when executed by the processor(s) of the source device (110) and/or the target device (120) cause the source device (110) and/or the target device (120) to provide the functionality of the applications described throughout the application.

In one or more embodiments, while performing, for example, one or more operations requested by a user, applications installed on the source device (110) and/or the target device (120) may include functionality to request and use physical and/or logical components of the source device (110) and/or the target device (120). Applications may also include functionality to use data stored in storage/memory resources of the source device (110) and/or the target device (120). The applications may perform other types of functionalities not listed above without departing from the scope of the invention. In one or more embodiments, while providing application services to a user, applications may store data that may be relevant to the user in storage/memory resources of the source device (110) and/or the target device (120).

In one or more embodiments, the applications are migrated from the source device (110) to the target device (120) using an application migration operation. Further details regarding migration of applications is discussed below.

In one or more embodiments, as described above, the source device (110) and the target device (120) include a firewall (e.g., Firewall A (112), Firewall B (122), etc.) and a data migration agent (e.g., source data migration agent (114) and target data migration agent (124)).

In one or more embodiments, a firewall (e.g., 112, 122, etc.) is a network monitoring/security component that monitors all incoming and outgoing network traffic (e.g., requests, responses, calls, etc.), in which it decides whether to allow or block specific network traffic based on a defined set of security rules. A firewall may be, for example (but not limited to): a hardware component, a software component, a software as-a-service (SaaS), a private cloud, etc. The aforementioned example is not intended to limit the scope of the invention.

A firewall (e.g., 112, 122, etc.) may include functionality to monitor (e.g., track) network traffic in the network (105) to obtain a dataset. In one or more embodiments, the dataset may include, for example (but not limited to): a request (e.g., an application programming interface (API) call), a type of a request (e.g., a "get" request, a "delete" request, an "update" request, a "post" request, etc.), a response to a request (e.g., a response to an API call), corresponding response time for a request, a list of application data that is being used (e.g., obtained, updated, etc.) by an API (e.g., application data 1 and 2 are being used by API X to change locations of both data in the file system), a list of operations that is being done on application data (e.g., while renaming application data 2, API X encrypted application data 2; after encrypting, API X duplicated and modified application data 2), a usage level (e.g., 50 times in 1 hour, 10 times in 1 minute, etc.) of an application data by an API, a period of time within which application data is being used by an API, etc.

As used herein, an "API call" may refer to a process of an application or a computing device submitting a request to an API (e.g., a component that acts as the "front door" for applications to access data and/or functionality from back-end services) to retrieve the requested data from an external application or an external computing device.

In one or more embodiments, a request and a response to that request may be communicated over the network (105). In one or more embodiments, corresponding response time for a request may be a period of time, with a definite start and end, within which a response process is set to be completed.

In one or more embodiments, the firewall (e.g., 112, 122, etc.) may periodically obtain the dataset from the network traffic. The firewall may also obtain the dataset from the network traffic in real-time. The firewall may then store (temporarily or permanently) the dataset in a storage/memory resource of the corresponding device.

In one or more embodiments, the firewall (e.g., 112, 122, etc.) may also monitor the network traffic to determine, for example (but not limited to): availability of the network (105), unusual activities (e.g., exploitation events) on the network (105), etc. In most cases, an unusual activity on the network (105) may be a sign of a security issue (e.g., a malicious attack, DDOS attack, malware attack, etc.). Because of the determined unusual activity, the firewall may notify an administrator (e.g., a network service provider (NSP)) of the network (105). Based on receiving the notification from the firewall, the NSP of the network (105) may reconfigure the network (105) to fix the security issue.

In one or more embodiments, because of increased network traffic, a firewall (e.g., 112, 122, etc.) may detect latency (e.g., delay) in the network (105). Because of the latency (e.g., 35 ms latency Quality of Service (QoS) network connection), the firewall may also notify the NSP. Based on receiving the notification from the firewall, the NSP may also reconfigure the network (105) to minimize the latency (e.g., the time it takes for data packets/packages to be transmitted, stored, or retrieved).

In one or more embodiments, the firewall may detect latency in the network traffic because of, for example (but not limited to): an increased amount of requests, an increased amount of responses, an increase in a size of a request, an increase in a size of a response, etc. One of ordinary skill will appreciate that a firewall (e.g., 112, 122, etc.) may perform other functionalities without departing from the scope of the invention.

In one or more embodiments, a firewall (e.g., 112, 122, etc.) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the firewall described throughout this application. Alternatively, in one or more embodiments, the firewall may also be implemented as a logical device.

In one or more embodiments, because the source device (110) and/or the target device (120) store and manage business-critical data and applications (e.g., services), data security is a key aspect. To achieve data security, as an additional, active, standby, and reliable security layer, a data migration agent (e.g., 114 and/or 124) may be deployed between (or disposed between) a firewall (e.g., 112, 122, etc.) and other components of the corresponding device (e.g., 110, 120, etc.) so that, for example, (i) each component behind the security module may remain intact, and (ii) business-critical data and services and their application migration operations may not directly exposed to the network (105) (because, in general, most of database applications and/or web services provided by a source device are directly exposed to a network with the protection of a single firewall layer, and in case of any attack or disaster, the device may be vulnerable to direct attacks or impacts).

In one or more embodiments, the source device (110) and/or the target device (120) include one or data migration agents (e.g., 114 and 124) that execute independently from a firewall (e.g., 112, 122, etc.) of the corresponding device. More specifically, one instance of a data migration agent (e.g., 114 and 124) may be deployed to each device, for example, of an organization.

In one or more embodiments, as being a lightweight multi-site application executing in each site of an organization, the organization may easily configure, deliver, and manage each data migration agent (e.g., 114 and 124) across, for example, multiple cloud environments for high availability and reliability. Further, each data migration agent (e.g., 114 and 124) may provide, for example (but not limited to): data migration operations, resource monitoring such as monitoring computing resources (e.g., processing, storage/memory, virtualization, networking, etc.), network traffic management across an organization's multiple devices and public cloud provider networks, etc. In order to provide the aforementioned functionalities, each data migration agent (e.g., 114 and 124) may (i) monitor the network traffic to and from the respective device, (ii) monitor known vulnerabilities of applications during an application migration operation, and (iii) monitor resource usage and availability of the respective device. In one or more embodiments, monitoring the network traffic includes monitoring at any level of a network stack or at any protocol, including at least the transport control protocol (TCP) layer.

In one or more embodiments, the data migration agents (e.g., 114 and 124) may, (i) provide a secure (e.g., an encrypted) tunnel by employing a tunneling protocol (e.g., the generic routing encapsulation (GRE) tunneling protocol, the IP-in-IP tunneling protocol, the secure shell (SSH) tunneling protocol, the point-to-point tunneling protocol, the virtual extensible local area network (VXLAN) protocol, etc.), (ii) set up efficient and secure connections (e.g., a virtual private network (VPN) connection (or a trust relationship), a secure socket layer VPN (SSL VPN) connection, an IP security (IPsec) based VPN connection, a transport layer security VPN (TLS VPN) connection, etc.) between networks, (iii) enable the usage of unsupported network protocols, (iv) manage access to resources between different networks (with more granular control) and track all the operations and network traffic logins, and (v) in some cases, enable users to bypass firewalls (e.g., provide endpoint-to-endpoint connections across a hybrid network without opening firewall rules in an enterprise network). To this end, the data migration agent (e.g., 114 and 124) may include any logic, functions, rules, or operations to perform services or functionalities (for communications between source device (110) and target device (120)) such as, for example, SSL VPN connectivity, SSL offloading, switching/load balancing, hypertext transfer protocol secure (HTTPS)-encrypted connections, domain name service (DNS) resolution, and acceleration techniques (e.g., compression (e.g., a context-insensitive compression or context-sensitive compression by employing a delta-type compression model, a lossless compression model, or a lossy compression model), decompression, TCP pooling, TCP multiplexing, TCP buffering, caching, etc.).

As used herein, in networking, "tunneling" is a way for transporting data across a network (e.g., 105) using protocols (standardized set of rules for (i) formatting and processing data, and (ii) enabling computing devices to communicate with one another) that are not supported by that network. In general, a "secure tunnel" refers to a group of microservices that includes, for example (but not limited to): a user interface (UI) server service, an API server service, a controller service, a tunnel connection service, an application mapping service, etc.

Tunneling works by encapsulating packets (packets are small pieces of data that may be re-assembled at their destination into a larger file), in which an "encapsulated packet" is essentially a packet inside another packet. In an encapsulated packet, the header and payload of the first packet goes inside the payload section of the surrounding packet where the original packet itself becomes the payload.

In one or more embodiments, encapsulation may be useful for encrypted network connections ("encryption" refers to the process of scrambling data in such a way that the data may only be unscrambled using a secret encryption key, where the process of undoing the encryption is called "decryption"). If a packet is completely encrypted (including the header), then network routers will not be able to transport the packet to its destination because they do not have the key and cannot see its header. By wrapping the encrypted packet inside another unencrypted packet, the packet may travel across networks like normal.

In one or more embodiments, the data migration agent (e.g., 114 and 124) may provide, for example, a TLS VPN connection between source device (110) and target device (120). For example, target data migration agent (124) may request (e.g., initiate) generation (e.g., establishment) of an end-to-end secure tunnel (e.g., a TLS VPN connection) from target device (120) to source device (110) over the network (105). Once the secure tunnel is generated: (i) source data migration agent (114) may receive one or more data packets (that are intercepted by target data migration agent (124)), (ii) source data migration agent (114) may encrypt the data packets and transmit them to target data migration agent (124) via the secure tunnel, (iii) after receiving the data packets, target data migration agent (124) may decrypt the data packets, (iv) if the data packets satisfy one or more attribution rules specified in configuration parameters (described below in reference to FIG. 2), target data migration agent (124) allows the data packets to continue to other components of the target device (120), and (v) source data migration agent (114) and target data migration agent (124) may then effectively terminate the secure tunnel by managing the behavior of the secure tunnel (e.g., the TCP connection) between source device (110) and target device (120).

In one or more embodiments, the data migration agents (114 and 124) may include an encryption/decryption engine (not shown) providing logic, business rules, functions, or operations for handling the processing of any security related protocol (e.g., the SSL protocol, the TLS protocol, etc.) or any function related thereto. For example, the encryption/decryption engine may encrypt and/or decrypt data packets (based on executable instructions running on an encryption/decryption processor), or any portion thereof, communicated via the data migration agents (114 and 124). The encryption/decryption engine may also establish secure tunnel connections on behalf of the data migration agents (114 and 124). In one or more embodiments, the data migration agents (114 and 124) may also include a network optimization engine (not shown) for optimizing, accelerating, or otherwise improving the performance, operation, or quality of any network traffic (or communications) traversing the network devices.

One of ordinary skill will appreciate that data migration agents (114 and 124) may perform other functionalities without departing from the scope disclosed herein. In one or more embodiments, data migration agents (114 and 124) may be configured to perform all, or a portion, of the functionalities described in FIGS. 3.1-3.3. Additional details about the security module are described below in reference to FIG. 2.

In one or more embodiments, data migration agents (114 and 124) may be implemented as a computing device (e.g., 400, FIG. 4). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the security module described throughout this application. Alternatively, in one or more embodiments, the data migration agents (114 and 124) may also be implemented as a logical device.

In one or more embodiments, the network (105) may represent a computing network configured for computing resources and/or messages exchange among registered computing hosts. As discussed above, components of the system (100) may operatively connect to one another through the network (105) (e.g., a LAN, a WAN, a mobile network, a wireless LAN (WLAN), etc.). In one or more embodiments, the network (105) may be implemented using any combination of wired and/or wireless network topologies, and the network (105) may be operably connected to the Internet or other networks. Further, the network (105) may enable interactions between source device (110), target device (120), and the server module (130) through any number and types of wired and/or wireless network protocols (e.g., TCP, UDP, Internet Protocol version 4 (IPv4), Internet Protocol version 6 (IPv6) etc.). Further, the network (105) may be configured to perform all, or a portion, of the functionality described in FIGS. 3.2 and 3.3.

The network (105) may encompass various interconnected, network-enabled subcomponents (not shown) (e.g., switches, routers, gateways, cables etc.) that may facilitate communications between the components of the system (100).

In one or more embodiments, the server module (130) may be physical or logical computing devices configured for receiving data from the data migration agents (e.g., 114, 124, etc.) across one or more organizations and providing updates to the data migration agents (e.g., 114, 124, etc.) across one or more organizations. In one or more embodiments, the server module (130) receives information collected by the data migration agents (e.g., 114, 124, etc.) as described below, information published by third-parties about applications (e.g., known vulnerabilities and/or updates for applications), and/or other information pertinent to data security. The server module (130) may utilize this information to generate updates for the data migration agents (e.g., 114, 124, etc.) and send the updates as they become available. As such, the server module (130) provides functionality to keep the data migration agents (e.g., 114, 124, etc.) up-to-date using the latest intelligence.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a CPU, a graphical processing unit (GPU), a data processing unit (DPU), a computation acceleration resource, application specific integrated circuits (ASICs), a digital signal processor for facilitating high speed communication, etc.

In one or more embodiments, a storage or memory resource (not shown) may refer to a measurable quantity of a storage/memory-relevant resource type, which can be requested, allocated, and consumed. A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), an SSD, RAM, Flash memory, a tape drive, an FC-based storage device, a floppy disk, a diskette, a compact disc (CD), a digital versatile disc (DVD), a NVMe device, a NVMe over Fabrics (NVMe-oF) device, resistive RAM (ReRAM), persistent memory (PMEM), virtualized storage, virtualized memory, etc.

As used herein, "storage" refers to a hardware component that is used to store data in a client. Storage may be a physical computer-readable medium. In most cases, storage may be configured as a storage array (e.g., a network attached storage array), in which a storage array may refer to a collection of one or more physical storage devices. Each physical storage device may include non-transitory computer-readable storage media, in which the data may be stored in whole or in part, and temporarily or permanently.

As used herein, "memory" may be any hardware component that is used to store data in a client. The data stored may be accessed almost instantly (e.g., in milliseconds) regardless of where the data is stored in memory. The memory may provide the above-mentioned instant data access because the memory may be directly connected to a CPU on a wide and fast bus (e.g., a high-speed internal connection that transfers data among hardware components of a client).

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card, a network adapter, a network processor, etc.

In one or more embodiments, a networking resource may implement and/or support the above-mentioned protocols to enable the communication between the client and external entities. For example, a networking resource may enable the client to be operatively connected, via Ethernet, using a TCP protocol to form a "network fabric", and may enable the communication of data between the devices. In one or more embodiments, each device may be given a unique identifier (e.g., an IP address) to be used when utilizing the above-mentioned protocols.

While FIG. 1 shows a configuration of components, other configurations may be used without departing from the scope of embodiments described herein. Accordingly, embodiments disclosed herein should not be limited to the configuration of components shown in FIG. 1.

Figure 2:
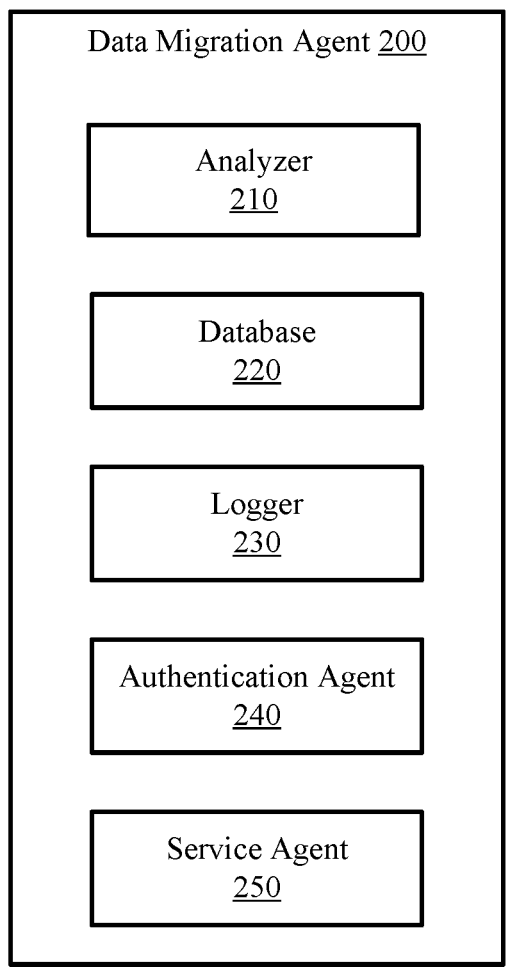
FIG. 2 shows a diagram of a data migration agent in accordance with one or more embodiments.

Turning now to FIG. 2, FIG. 2 shows a diagram of a data migration agent (200) in accordance with one or more embodiments. The data migration agent (200) is be an example of the data migration agent (e.g., 114 and 124) discussed above in reference to FIG. 1. The data migration agent (200) may include an analyzer (210), a database (220), a logger (230) an authentication agent (240), and a service agent (250). The data migration agent (200) may include additional, fewer, and/or different components without departing from the scope of the invention. Each component may be operably connected to any of the other components via any combination of wired and/or wireless connections. Each component illustrated in FIG. 2 is discussed below.

In one or more embodiments, the analyzer (210) may include functionality to, e.g.,: (i) intercept, identify, and accept/reject (in conjunction with the authentication agent (240)) a request/call/network traffic using an interception mechanism (i.e., the authentication agent (240)), (ii) provide an additional layer of security/authentication mechanism (on top of a firewall) during any type of communication/transaction/operation (e.g., an application migration operation from a source device to a target device) (a) for maximum data security, integrity, and availability, and (b) to prevent initiation of any invalid/bogus data migration operation, (iii) obtain (or receive) an encrypted secure string-appended request and send that request to the corresponding target over a network (e.g., 105, FIG. 1), (iv) based on (iii), send the encrypted secure string-appended request and its corresponding details (e.g., an IP address of a targeted destination and/or a port address of a target component, a client-side configuration associated with the request, information regarding data (e.g., type and/or content of data that is planned to be accessed, a device/domain/unique identifier (IP address) of a user that wants to access that data, etc.), etc.) to the logger (230), (v) intercept and identify (in conjunction with the authentication agent (240)) a request/call (e.g., an encrypted secure string-appended request, a DNS request, an Internet control message protocol (ICMP) request, a network access request to initiate a hacking attack, a data access request, etc.) received from an entity (e.g., another analyzer of another security module (which is a valid/trusted entity), a compromised user, an invalid user, a malicious insider, a credential/data thief, a negligent insider, etc.) based on a security protocol set by the related organization, (vi) based on (v) and the corresponding details of the request (which is decrypted and sent by the authentication agent (240) post decryption), make a determination that the request is valid or not, (vii) based on the determination performed in (vi), reject the invalid request and send the rejected request (including its corresponding details) to the logger (230), (viii) based on the determination performed in (vi), accept the valid request and initiate generation of a secure data continuity path (e.g., a secure/encrypted, point-to-point tunnel) (described above in reference to FIG. 1) across (or overlay on) a network (e.g., 105, FIG. 1), (ix) based on the determination performed in (vi), initiate an operation (e.g., an application migration operation) that is defined in the intercepted request (described in (v)) by notifying the valid sender (i.e., the valid entity described in (v)) of that request, (x) in response to receiving a notification from another analyzer, send (or forward) the notification to a component of the corresponding device, (xi) receive outgoing network traffic (e.g., data packets or other communication protocol compliant data structures that are being replicated) from the component (described in (x)) that is planned to be transmitted via the secure data path (described in (viii)), (xii) based on (xi), verify (and filter some of the outgoing network traffic if necessary) that the outgoing network traffic satisfies one or more attribution rules specified in the configuration parameters (e.g., verify the validity of the outgoing network traffic), (xiii) based on the verification performed in (xii), initiate transmission of the outgoing network traffic to the target using the secure data path, (xiv) send the details of the transmission operation to the logger (230), (xv) notify an administrator of the corresponding device about the initiation of the secure, tamper-free, and efficient transmission operation (e.g., the application migration operation) using the corresponding device's graphical user interface (GUI) (or using a visualization module (not shown) of the data migration agent (200)), and (xvi) as part of data management services provided by the corresponding device, provide a secure method for storing and accessing data managed by the corresponding device.

In one or more embodiments, as mentioned above, the analyzer (210) (i) may operate as a reverse proxy (e.g., a unidirectional proxy, a reverse proxy agent, an interceptor, etc.) (or may be configured to operate in a reverse proxy mode) to intercept and scrutinize all incoming requests/calls/network traffic from the network (e.g., 105, FIG. 1) (that are allowed or not allowed (but bypassed) a corresponding firewall (e.g., 112, 122, etc., FIG. 1) (as the first layer of security)) towards the corresponding devices to prevent any malicious attacks (e.g., hacking/data hijacking attacks, DDOS attacks, etc.), and (ii) may operate in various different OS architectures based on OS wrapper packaging (e.g., Linux®, Docker®, Microsoft® Windows, etc.), or in any embedded OS, any network OS, any real-time OS, any open source OS, any OS for mobile computing devices, etc. As being a reverse proxy and an additional layer of security, the analyzer (210) may also monitor all the outgoing responses/calls/network traffic and notify the logger (230) to log their details in the database (220).

To enable these (and the aforementioned) functionalities of the analyzer (210), the data migration agent (200) may be deployed in-line and between a firewall (e.g., 112, 122, etc., FIG. 1) and other components of a corresponding device. As described above, the data migration agent (200) may not be in-line at all times, but may become in-line upon certain triggers In this manner, for example, (i) all network traffic may pass through the data migration agent (200) before arriving at a destination within a corresponding device (e.g., the analyzer (210) may manage all incoming requests from a device, and direct the valid requests to one or more services provided by the corresponding device), (ii) the analyzer (210) may forward, re-route, load-balance, or otherwise provide (in conjunction with the authentication agent (240)) the received network communication (e.g., data packets), (iii) the analyzer (210) may block (in conjunction with the authentication agent (240)) an invalid request/call/network traffic, and (iv) the analyzer (210) may filter (e.g., drop) some of the outgoing network traffic (i.e., data packets or other communication protocol compliant data structures) that is planned to be transmitted via a secure data path.

In one or more embodiments, the database (220) may be a fully managed, local, and lightweight database (or any logical container such as SQLite database) that acts as a shared storage or memory resource (discussed above) that is functional to store unstructured and/or structured data. Further, the database (220) may also occupy a portion of a physical storage/memory device or, alternatively, may span across multiple physical storage/memory devices.

In one or more embodiments, the database (220) may be implemented using physical devices that provide data storage services (e.g., storing data and providing copies of previously stored data). The devices that provide data storage services may include hardware devices and/or logical devices. For example, the database (220) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (220) may include a memory device (e.g., a dual in-line memory device), in which data is stored and from which copies of previously stored data are provided. As yet another example, the database (220) may include a persistent storage device (e.g., an SSD), in which data is stored and from which copies of previously stored data is provided. As yet another example, the database (220) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (220) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (220) may store (temporarily or permanently) unstructured and/or structured data that may include (or specify), for example (but not limited to): details of web services, applications, database services, hardware, active sessions and/or migration operations on the source device and/or the target device, one or more policies (e.g., imported from an active directory, domain controller, and/or set by users) and/or rules for the operation (or configuration) of any portion of the analyzer (210), configuration parameters, details of other application instances deployed at different sites, details of earlier active socket connections that are presently closed, details of currently active socket connections, details of previously rejected requests (e.g., due to credential mismatches or timeouts), block lists of malicious machines (e.g., lists maintained by a user, lists of machines sending invalid requests, etc.), details of secure upload servers to which any information stored in the database (220) may be sent, cleanup schedules for the database (220), information regarding the risk level of data stored in the source device, a profile of a valid user, a profile of an invalid user, one or more outputs of the processes performed by the analyzer (210), recently obtained user information (e.g., records, credentials, etc.) of a user, a port's user guide, a port's release note, a user posted approximated port activation time, a model name of a hardware component, a serial number of a computing device, a hardware identification (ID) number of a hardware component, an identifier of a computing device's manufacturer, a setting of an application, a version of an application, a product identifier of an application, known vulnerabilities of an application computing resource statistics of an application, computing resource statistics of migrating an application, etc.

In one or more embodiments, the configuration parameters may specify (or include), for example (but not limited to): locations of applications at different sites, hardware, application, and/or database inventory details of a the source device, filter policies for device scans and monitoring, steps to take (e.g., based on pre-defined option from which a user may select, user-defined steps, etc.) when the data migration agent (200) identifies a suspicious user account and/or foreign actor, details of different data migration agents with which the data migration agent (200) may share data, reporting console setting, etc.

In one or more embodiments, during the deployment of the data migration agent (200), an administrator of the data migration agent (200) may directly provide the configuration parameters (which may be configured directly), or the configuration parameters may be imported by the administrator in the form of, for example, an extensible markup language (XML) file or JavaScript object notation (JSON) file.

In one or more embodiments, the unstructured and/or structured data may be updated (automatically) by third party systems (e.g., platforms, marketplaces, etc.) (provided by vendors) or by administrators based on, for example, newer (e.g., updated) versions of configuration parameters being available. The unstructured and/or structured data may also be updated when, for example (but not limited to): a different type of attack is captured for data access, a new response ruleset is generated, a new request ruleset is generated, etc.

In one or more embodiments, the unstructured and/or structured data may be maintained by, for example, the analyzer (210). The analyzer (210) may add, remove, and/or modify those data in the database (220) to cause the information included in the database (220) to reflect the latest version of, for example, configuration parameters. The unstructured and/or structured data available in the database (220) may be implemented using, for example, lists, tables, unstructured data, structured data, etc. While described as being stored locally, the unstructured and/or structured data may be stored remotely, and may be distributed across any number of devices without departing from the scope of the disclosure.

While the database (220) has been illustrated and described as including a limited number and type of data, the database (220) may store additional, less, and/or different data without departing from the scope of the disclosure.

In one or more embodiments, the logger (230) may be a shared storage or memory resource (discussed above) that is functional to store unstructured and/or structured data. Further, the logger (230) may also occupy a portion of a physical storage/memory device or, alternatively, may span across multiple physical storage/memory devices.

In one or more embodiments, the logger (230) may be implemented using physical devices that provide data storage services. The devices that provide data storage services may include hardware devices and/or logical devices. For example, the logger (230) may include any quantity and/or combination of memory devices, long-term storage devices, other types of hardware devices that may provide short-term and/or long-term data storage services, and/or logical storage devices (e.g., virtual persistent storage/virtual volatile storage).

For example, the logger (230) may include a memory device (e.g., a dual in-line memory device), in which data is stored and from which copies of previously stored data are provided. As yet another example, the logger (230) may include a persistent storage device (e.g., an SSD), in which data is stored and from which copies of previously stored data is provided. As yet another example, the logger (230) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the logger (230) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or another hardware device that allocates storage resources of the physical storage devices.

In one or more embodiments, the logger (230) may store/log/record (temporarily or permanently, in conjunction with the database (220), and based on the log level configuration set by an administrator of the data center (e.g., 110, 120, etc., FIG. 1)) unstructured and/or structured data that may include (or specify), for example (but not limited to): a valid (e.g., a granted) request and its corresponding details, an invalid (e.g., a rejected) request and its corresponding details, one or more details (e.g., content of the transmitted data packets, information regarding a targeted destination, etc.) of a recently initiated data migration operation, one or more details (e.g., content of the intercepted data packets, information regarding the sender (e.g., a high priority trusted user, a low priority trusted user, etc.), information regarding the size of intercepted data packets, etc.) of an incoming request/call/network traffic, one or more details (e.g., content of the outgoing data packets, information regarding a targeted destination, information regarding the size of outgoing data packets, etc.) of an outgoing request/call/network traffic, a mapping table that shows the mappings between an incoming request/call/network traffic and an outgoing request/call/network traffic, a data migration operation history documentation of a valid user, recently obtained user activity records, a cumulative history of user activity records obtained over a prolonged period of time, a cumulative history of network traffic logs obtained over a prolonged period of time, previously received malicious data access requests from an invalid user, previously received malicious data migration requests from an invalid user, backup history documentation of a workload, a documentation that indicates a set of jobs (e.g., an application migration job, etc.) that has been initiated, a documentation that indicates a status of a job (e.g., how many jobs are still active, how many jobs are completed, etc.), a cumulative history of initiated application migration operations (e.g., sessions) over a prolonged period of time, a cumulative history of initiated application migration operations over a prolonged period of time, any changes to configuration parameters (as well as the relevant parties and information associated with such changes, in which the changes may be result of changes made by an administrator or via administrative systems), details of data objects that do not match the corresponding configuration parameters (in this manner, the logged details may be used to audit a user, incoming network traffic, and/or outgoing network traffic), etc. Based on the aforementioned data, for example, the analyzer (210) may perform user analytics to infer the profile of users communicating with the corresponding devices (e.g., 110, 120, etc. FIG. 1).

In one or more embodiments, data logged by the logger (230) may be registered. That is, the data may be indexed or otherwise associated with registration records. A registration record may be a data structure that includes information that enables the logged data to be accessed. For example, a registration record may include an identifier associated with the data. A registration record may include different, additional, and/or less information for access to the data without departing from the scope of the invention. When the logger (230) stores data in itself, the logger (230) may provide a corresponding registration record to the database (220). The database (220) may utilize the aforementioned registration record to notify other entities of the existence of the data and/or to facilitate access to the data in the future.

In one or more embodiments, the authentication agent (240) may include functionality to, e.g.,: (i) obtain (or receive) system time of a device (e.g., 110, 120, FIG. 1), (ii) based on (i), convert the system time to Coordinated Universal Time (UTC)-based system time (to maintain system time uniformity around the world), (iii) generate, based on the UTC-based system time and one or more configuration parameters (e.g., parameters to generate a secure string, reverse proxy parameters, etc.) set by an administrator of the component, a fresh secure string (e.g., a secure token, a secure password, etc.), (iv) based on (iii), encrypt (e.g., a way of translating data from plaintext (unencrypted) to cipher text (encrypted), in which encrypted data may be accessed with an encryption key) the secure sting using an encryption model (e.g., an asymmetric encryption method, a symmetric encryption model, a 128-bit encryption model, etc.), (v) based on (iv), append the encrypted secure string to a request (e.g., a data continuity request) intercepted by the analyzer (210), (vi) based on (v), send the encrypted secure string-appended request and its corresponding details to the analyzer (210), (vii) decrypt (e.g., a way of translating data from cipher text to plaintext, in which decrypted data may be accessed with a decryption key) a request/call/ network traffic (e.g., an encrypted secure string-appended request) intercepted by the analyzer (210), and (viii) based on (vii) extract (by implementing any necessary process such as, for example, network address translation) and send the corresponding details of the decrypted (e.g., resolved) request to the analyzer (210). The authentication agent (240) may be implemented using hardware, software, or any combination thereof.

In one or more embodiments, the service agent (250) may include functionality to manage one or more services provided by a component of the security module (200). For example, the service agent (250) may shut down one or more services/functionalities (e.g., the logging service) provided by the logger (230) if the analyzer (210) could not perform its main services/functionalities because of a recent surge in incoming network traffic (e.g., when there is an unusually high amount of activity in the incoming network traffic). The service agent (250) may be implemented using hardware, software, or any combination thereof.

In one or more embodiments, the security module (200) may also include a visualization module. The visualization module may include functionality to, e.g.,: (i) receive one or more details (described above) of a recently initiated application migration operation, and display the aforementioned content on its GUI (for example, to an administrator of the corresponding device), (ii) receive one or more details (described above) of an incoming request/call/network traffic, and display the aforementioned content on its GUI (for example, in a separate window(s) on its GUI), and (iii) receive one or more details (described above) of an outgoing request/call/network traffic, and display the aforementioned content on its GUI (for example, in a separate window(s) on its GUI). In one or more embodiments, the visualization module may concurrently display one or more separate windows on its GUI.

In one or more embodiments, for example, while displaying an incoming request/call/network traffic and/or an outgoing request/call/network traffic, the visualization module may represent: (i) a normal (e.g., a valid) incoming request/call/network traffic with green color tones, and (ii) an abnormal (e.g., an invalid) incoming request/call/network traffic with red color tones. The visualization module may be implemented using hardware, software, or any combination thereof.

In one or more embodiments, the analyzer (210), database (220), logger (230), authentication engine (240), service agent (250), and visualization module may be utilized in isolation and/or in combination to provide the above-discussed functionalities. These functionalities may be invoked using any communication model including, for example, message passing, state sharing, memory sharing, etc. By doing so, the data migration agent (200) may address issues related to data security, integrity, and availability proactively.

FIGS. 3.1-3.3 show a method for secure application migration from a source device to a target device in accordance with one or more embodiments. While various steps in the method are presented and described sequentially, those skilled in the art will appreciate that some or all of the steps may be executed in different orders, may be combined or omitted, and some or all steps may be executed in parallel without departing from the scope of the invention.

The method shown in FIGS. 3.1-3.3 may provide enhanced data security when conducting an application migration operation. Further, applying the method across a large set of users can provide a large data set that includes how bad actors attempt to infiltrate computer systems and attack systems at a TCP layer. The data set may then be used to update a data migration agent (e.g., 200, FIG. 2), which may enable the data migration agent to identify a greater amount of suspicious activity during an application migration operation. Further, users of the relevant computer systems may be provided increased information regarding what specific user accounts and activities of the user accounts led to a determination of suspicious activity.

Turning now to FIG. 3.1, the method shown in FIG. 3.1 may be executed by, for example, the above-discussed data migration agent (e.g., 200, FIG. 2). Other components of the system illustrated in FIG. 1 may also execute all or part of the method shown in FIG. 3 without departing from the scope.

In Step 300, a source device (e.g., source device (110), FIG. 1) initiates an application migration operation from the source device to a target device (e.g., 120, FIG. 1).

In Step 302, the source data migration agent (SDMA) (e.g., 114, FIG. 1) identifies the target device. In one or more embodiments, the target device may be identified by receiving a specific target device information from the source device. In one or more embodiments, the data migration agent identifies the target device based on criteria sent to the data migration agent from the source device.

In Step 304, the source data migration agent and the target data migration agent (TDMA) (e.g., 124, FIG. 1) initiate an active scan of the respective device. The active scan monitors the network traffic received by the respective device and includes monitoring of several security parameters as described in detail below. In addition, the active scan may be initiated for each application migration operation such that if a device is undergoing multiple application migration operations, then each operation will be subject to a separate active scan. In addition, initiating the active scan after initiation of the application migration operation may preserve computing resources of the respective device when the application migration is not ongoing.

In Step 306, the source data migration agent and the target data migration agent work together to establish a new connection between the source device and the target device using a reverse proxy technique. This Step 306 is discussed in greater detail in FIGS. 3.2-3.3 below.

In Step 308, the source data migration agent begins migrating the application from the source device to the target device using the new connection established in Step 306.

In Step 310, the source data migration agent and the target data migration agent monitor, using the active scan, the network traffic at the TCP layer of the respective devices while the application migration is ongoing. As described above, each data packet may include a TCP layer which includes, among other things, information about the source of the data packet, information about the target of the data packet, information about the type of request, and other information about the transmission of the data packet. In one or more embodiments, the monitoring includes monitoring for structural monitoring, DDOS attacks, and flags associated with the data packet. In one or more embodiments, the structural monitoring includes checking the different flags and header fields and the sizes of each, checking the internet protocol version, checking the relevance of code bits data (e.g., SYN, ACK, FIN, PSH, RST, URG, etc.), checking packet checksum status, checking packet data against windows size field (e.g., flow control), checking the TCP sequencing, and/or checking source and destination ports. In one or more embodiments, monitoring for DDOS attacks includes checking the number of requests from a source MAC and IP addresses (e.g., to avoid a SYN type DDOS attack), checking the sequence number of every ACK request by comparing the sequence number with a stored sequence series (e.g., to avoid ACK flooding type DDOS attack), checking cross-site request forgery (CSRF) tokens (e.g., to avoid session high-jacking), and/or checking information about the sender against a list of known bad actors (e.g., to avoid any kind of communication with a known bad actor). In one or more embodiments, monitoring the flags associated with the data packet includes checking whether the flags (e.g., SYN, ACK, FIN, PSH, RST, URG, etc.) are relevant to the application migration operation.

In Step 312, the relevant data migration agent determines whether the monitoring indicates suspicious activity. In one or more embodiments, determining that any one of the monitored items listed above is abnormal and/or invalid, then the data migration agent may determine that the associated data packet is indicative of suspicious activity. If the data migration agent determines that the monitoring does not indicate suspicious activity, then the method continues to Step 314. If the data migration agent determines that the monitoring does indicate suspicious activity, then the method continues to Step 316.

In Step 314, the relevant data migration agent determines whether the application migration operation has completed. In one or more embodiments, the data migration agent receives an indication that the application migration operation is complete and bases the determination on that indication. If the data migration agent determines that the application migration operation is not over, then the method returns to Step 310 and the data migration agent continues to monitor the application migration operation. If the data migration agent determines that the application migration operation is over, then the data migration agent may terminate the active scan and/or the connection and the method may end following Step 314.

In Step 316, the relevant data migration agent performs an action from an action set based on determining that the monitoring does indicate suspicious activity. In one or more embodiments, the action set includes rejecting the data packet associated with the suspicious activity and/or logging information about the data packet such as which part of the data packet was determined to be abnormal and/or invalid, source information (e.g., MAC address, IP address, source port number, etc.), type of request, or any other information contained within the data packet.

In Step 318, the relevant data migration agent determines whether the suspicious activity is above a threshold. In one or more embodiments, a value may be assigned to the suspicious activity and may be based on what caused the monitoring to indicate the suspicious activity. For example, suspicious activity associated with a lower level threat may be assigned a lower value than suspicious activity associated with a higher level threat. In one or more embodiments, the value may be additive over the course of an application migration operation such that the values of multiple identified suspicious activities are added together. If the data migration agent determines that the value and/or cumulative value is below the threshold, then the method returns to Step 310 to provide continued monitoring of the application migration operation. If the data migration agent determines that the value and/or cumulative value is above the threshold, then the data migration agent may end the application migration operation, terminate the active scan, and/or terminate the connection and the method may end following Step 318.

Turning now to FIG. 3.2, the method shown in FIG. 3.2 may be executed by, for example, the above-discussed data migration agent (e.g., 200, FIG. 2). Other components of the system illustrated in FIG. 1 may also execute all or part of the method shown in FIG. 3 without departing from the scope.

In Step 330, in response to initiating the active scan (Step 304), the source data migration agent obtains (current) system time of the source device.

In Step 332, the source data migration agent converts the system time (obtained in Step 330) to UTC-based system time (to maintain system time uniformity around the world).

In Step 334, the source data migration agent generates a fresh secure string based on the UTC-based system time and configuration parameters (described above in reference to FIG. 2) set by an administrator of the source device. In one or more embodiments, the administrator may directly provide a secure string (e.g., a password, an identifier, a sentence, etc.) to the first security module. If this is the case (e.g., if the secure string is administrator-defined/provided), the administrator should not provide a secure string that may be guessed easily. In one or more embodiments, once the secure string is generated (or obtained directly from the administrator), the source data migration agent may store (temporarily or permanently) a copy of the secure string in its database (e.g., 220, FIG. 2).

In one or more embodiments, configuration parameters may specify a rule/parameter regarding a secure string expiry timeframe, which is set by the administrator, and is the same across all devices of the organization to perform a uniform and successful authentication process. In one or more embodiments, for example, the administrator may set the secure string expiry timeframe to zero (indicating a fresh secure string should be generated for each data continuity operation to make the operation more secure). If the secure string expiry timeframe was not set by the administrator, by default, the timeframe may be set to zero.

As yet another example, the administrator may not set the secure string expiry timeframe to zero (e.g., may be set to ten minutes) indicating that a fresh secure string should be generated periodically at the set time. In this case, the application migration operation may be less secure than if the time is set to zero, but may consume fewer computing resources and thus may be beneficial in situations in which response time is favored over security.

In Step 336, the source data migration agent encrypts the secure string (generated or obtained in Step 334) using an encryption model (e.g., an asymmetric encryption method, a symmetric encryption model, a 128-bit encryption model, etc.). In one or more embodiments, once the secure string is encrypted, the first security module may store (temporarily or permanently) a copy of the encrypted secure string in its database. Details of the encryption process are described above in reference to FIG. 2.

In Step 338, the source data migration agent appends (e.g., incorporates) the encrypted secure string to an application migration request, in which the encrypted secure string is appended to a header part of the request (to (i) supply authentication credentials associated with the request, (ii) make the request verifiable, (iii) enable other entities (e.g., the target data migration agent) to trust the accuracy of information included in the notification (for example, the secure string may act as proof of the request), and (iv) announce its presence). In one or more embodiments, the header may also include information regarding, for example (but not limited to): a user (e.g., a high priority user, a low priority user, etc.), a network connection (e.g., information regarding network traffic flow), content of a data packet, size of a data packet, an IP address of a target destination, a port address of a target destination, a protocol that is being used by a target destination, an encryption model that was used to encrypt a secure string, etc.

In Step 340, the source data migration agent sends the encrypted secure string-appended request to the target device over a network (e.g., 105, FIG. 1). Details of the network are described above in reference to FIG. 1. Further, the target device may be selected based on parameters set by a user, bandwidth available between the source device and the target device, and/or active transactions between the source device and the target device.

In Step 342, the source data migration agent logs the encrypted secure string-appended request and its corresponding details in its database. In one or more embodiments, an analyzer (e.g., 210, FIG. 2) of the source data migration agent may first send the encrypted secure string-appended request and its corresponding details to a logger (e.g., 230, FIG. 2) of the source data migration agent (or the logger may obtained the aforementioned information). The logger may then log the aforementioned information in the database (of the first security module).

In one or more embodiments, the corresponding details may include, for example (but not limited to): an IP address of a target destination and/or a port address of a target component, a client-side configuration associated with the request, information regarding data (e.g., type and/or content of data that is planned to be accessed, a device/domain/unique identifier (IP address) of a user that wants to access that data, etc.), API information of the request, a text length of the request, a request body of the request, etc.

Turning now to FIG. 3.3, the method shown in FIG. 3.3 may be executed by, for example, the above-discussed source data migration agent and the target data migration agent. Other components of the system (100) illustrated in FIG. 1 may also execute all or part of the method shown in FIG. 3.3 without departing from the scope of the embodiments disclosed herein.

In Step 350, the target data migration agent intercepts the encrypted secure string-appended request (sent in Step 340 of FIG. 3.2). In one or more embodiments, after decrypting the intercepted request (by its authentication agent (e.g., 240, FIG. 2)), the target data migration agent may analyze (e.g., inspect, perform feature engineering based on a historical record under the provided/obtained IP address information, etc.) the encrypted secure string-appended request (and its corresponding details) in accordance with rules/policies set by the administrator of the target device to extract useful information, for example (but not limited to): API information associated with the intercepted request, IP address information of the targeted destination, a text length of the intercepted request, a body of the intercepted request, a header of the intercepted request, IP address information (e.g., identity) of an entity (e.g., a data consumer, a computing device, etc.) that sent the request, etc.

In one or more embodiments, during the analysis, if the historical record of the provided/obtained IP address information is empty, the intercepted request may be an abnormal request (e.g., no "encrypted secure string-appended request" detected) (or may be a normal request that is sent by another authorized user).

In one or more embodiments, the target data migration agent may then store (temporarily or permanently) a copy of the extracted information in its database.

In one or more embodiments, while the target data migration agent analyzes the intercepted request, the target data migration agent may concurrently continue to provide its services to the target device to provide maximum level data protection, integrity, and availability for the components of the target device. For example, while analyzing an intercepted request/call/incoming network traffic, the target data migration agent may also intercept another request/call/incoming network traffic in parallel.

In Step 352, based on the configuration parameters (e.g., the request ruleset, described above in reference to FIG. 2), extracted information (in Step 350), and secure string expiry timeframe (set in Step 334; because (a) a secure string may be valid until the associated expiry timeframe has passed and (b) any request having a secure string that has passed the associated expiry timeframe may be rejected), the target data migration agent makes a determination as to whether the intercepted request (in Step 350) is valid. Accordingly, in one or more embodiments, if the result of the determination is YES, the method proceeds to Step 354. If the result of the determination is NO, the method alternatively proceeds to Step 316 in which the invalid request is deemed to indicate suspicious activity.

In one or more embodiments, based on the determination in Step 352, the target data migration agent may infer (or identify) whether, for example (but not limited to): a user that initiated the request has the required credentials (e.g., a required level of user priority) and/or is authorized to access data within the target device, the intercepted request is a valid request (e.g., the request sent by an authorized/trusted user, the request is an authentic request, etc.) or an invalid request (e.g., the request is related to a network attack initiated by a hacker), an "encrypted secure string" was appended to the header of the intercepted request, a secure string expiry timeframe is satisfied (with, for example, milliseconds sensitivity), etc.

In Step 354, as a result of the determination in Step 352 being YES, the target data migration agent tags the request as a valid request (e.g., a normal request), logs the accepted/verified request and its corresponding details in its database, and then the target data migration agent initiates the secure connection by notifying the source data migration agent. In one or more embodiments, when the source data migration agent receives the notification (e.g., the indication to initiate the secure connection) (which satisfies one or more attribution rules specified in the configuration parameters), both data migration agents may now be aware of each other and the application migration operation may be appropriately initiated.

In Step 356, the source data migration agent receives the notification sent by the target data migration agent in Step 354, and initiates generation of a secure data path (e.g., a secure tunnel) across the network. To this end, the source data migration agent and the target data migration agent may take action (or otherwise cooperate) in changing their configuration (e.g., modifying their policies, protocols, etc.) to generate the secure tunnel based on information obtained from the target data migration agent. Details of the secure tunnel are described above in reference to FIG. 1.

Following Step 356, the method may continue to Step 308 in FIG. 3.1, and the method of FIG. 3.3 may end.

Turning now to FIG. 4, FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as RAM, cache memory), persistent storage (406) (e.g., a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices (408) may be the same or different from the input device(s) (410). The input and output device(s) (408, 410) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing an application migration operation, the method comprising:
   initiating the application migration operation to migrate an application from a source device to a target device, wherein the source device comprises a source data migration agent (SDMA) and the target device comprises a target data migration agent (TDMA);
   initiating an active scan of network traffic at a transmission control protocol (TCP) layer;

establishing a secure data path between the source device and the target device by:
  obtaining, by the SDMA in response to the initiation of the active scan, coordinated universal time (UTC)-based system time of the source device;
  generating, by the SDMA, a secure string based on the coordinated UTC-based system time and a configuration parameter set by a user of the source device;
  encrypting, by the SDMA, the secure string to generate an encrypted secure string;
  appending, by the SDMA, the encrypted secure string to an application migration notification to generate an encrypted secure string-appended request;
  sending, by the SDMA, the encrypted secure string-appended request to the TDMA;
  receiving, from the TDMA, a confirmation that the encrypted secure string-appended request was properly received; and
  initiating, by the SDMA and based on the confirmation, the secure data path from the source device to the target device;
beginning migration of the application from the source device to the target device using the secure data path;
making a first determination, using the active scan, that a data packet is associated with suspicious activity, wherein the first determination is based on at least one of the following: making a second determination that the data packet comprises a structural abnormality, making a third determination that the data packet is indicative of a distributed denial-of-service (DDOS) attack, and making a fourth determination that the data packet comprises an irrelevant flag;
rejecting the data packet based on the first determination;
logging information about the data packet;
making a fifth determination that the application migration operation is complete; and
terminating the active scan and the secure data path based on the fifth determination.

2. The method of claim 1, further comprising:
updating the active scan based on the information about the data packet.

3. The method of claim 1, wherein the second determination is based on verifying flags, header fields, flag size, header field size, internet protocol version, packet checksum, flow control, TCP sequencing, source port, or destination port.

4. The method of claim 1, wherein the third determination is based on at least one of the following:
  determining that a number of requests from a media access control address and internet protocol address associated with the data packet exceeds a threshold value;
  determining that a sequence number of an ACK request of the data packet is invalid based on a comparison with the sequence number and a stored sequence series;
  determining that a cross-site request forgery token is invalid; and
  determining that the data packet is associated with a known bad actor.

5. The method of claim 1, further comprising:
generating and causing to display, based on the first determination, an alert to a user that the data packet was rejected.

6. The method of claim 1, wherein the first determination is based on the second determination.

7. The method of claim 1, wherein the first determination is based on the third determination.

8. A method for performing an application migration operation, the method comprising:
  initiating the application migration operation to migrate an application from a source device to a target device, wherein the source device comprises a source data migration agent (SDMA) and the target device comprises a target data migration agent (TDMA);
  initiating an active scan of network traffic at a transmission control protocol (TCP) layer;
  establishing a secure data path between the source device and the target device by:
    obtaining, by the SDMA in response to the initiation of the active scan, coordinated universal time (UTC)-based system time of the source device;
    generating, by the SDMA, a secure string based on the coordinated UTC-based system time and a configuration parameter set by a user of the source device;
    encrypting, by the SDMA, the secure string to generate an encrypted secure string;
    appending, by the SDMA, the encrypted secure string to an application migration notification to generate an encrypted secure string-appended request;
    sending, by the SDMA, the encrypted secure string-appended request to the TDMA;
    receiving, from the TDMA, a confirmation that the encrypted secure string-appended request was properly received; and
    initiating, by the SDMA and based on the confirmation, the secure data path from the source device to the target device;
  beginning migration of the application from the source device to the target device using the secure data path;
  making a first determination, using the active scan, that a data packet is associated with suspicious activity; and
  rejecting the data packet based on the first determination.

9. The method of claim 8, wherein the first determination is based on at least one of the following: making a second determination that the data packet comprises a structural abnormality, making a third determination that the data packet is indicative of a distributed denial-of-service (DDOS) attack, and making a fourth determination that the data packet comprises an irrelevant flag.

10. The method of claim 9, wherein the first determination is based on the second determination.

11. The method of claim 10, wherein the second determination is based on verifying flags, header fields, flag size, header field size, internet protocol version, packet checksum, flow control, TCP sequencing, source port, or destination port.

12. The method of claim 9, wherein the first determination is based on the third determination.

13. The method of claim 12, wherein the third determination is based on at least one of the following:
  determining that a number of requests from a media access control address and internet protocol address associated with the data packet exceeds a threshold value;
  determining that a sequence number of an ACK request of the data packet is invalid based on a comparison with the sequence number and a stored sequence series;
  determining that a cross-site request forgery token is invalid; and
  determining that the data packet is associated with a known bad actor.

14. The method of claim 8, further comprising:
logging information about the data packet; and updating the active scan based on the information about the data packet.

15. The method of claim 8, further comprising:
generating and causing to display, based on the first determination, an alert to a user that the data packet was rejected.

16. A non-transitory computer readable medium comprising computer readable program code, which when executed by a computer processor enables the computer processor to perform a method for performing an application migration operation, the method comprising:
 initiating the application migration operation to migrate an application from a source device to a target device, wherein the source device comprises a source data migration agent (SDMA) and the target device comprises a target data migration agent (TDMA);
 initiating an active scan of network traffic at a transmission control protocol (TCP) layer;
 establishing a secure data path between the source device and the target device by:
  obtaining, by the SDMA in response to the initiation of the active scan, coordinated universal time (UTC)-based system time of the source device;
  generating, by the SDMA, a secure string based on the coordinated UTC-based system time and a configuration parameter set by a user of the source device;
  encrypting, by the SDMA, the secure string to generate an encrypted secure string;
  appending, by the SDMA, the encrypted secure string to an application migration notification to generate an encrypted secure string-appended request;
  sending, by the SDMA, the encrypted secure string-appended request to the TDMA;
  receiving, from the TDMA, a confirmation that the encrypted secure string-appended request was properly received; and
  initiating, by the SDMA and based on the confirmation, the secure data path from the source device to the target device;
 beginning migration of the application from the source device to the target device using the secure data path;
 making a first determination, using the active scan, that a data packet is associated with suspicious activity, wherein the first determination is based on at least one of the following: making a second determination that the data packet comprises a structural abnormality, making a third determination that the data packet is indicative of a distributed denial-of-service (DDOS) attack, and making a fourth determination that the data packet comprises an irrelevant flag; and
 rejecting the data packet based on the first determination.

17. The non-transitory computer readable medium of claim 16, wherein the method further comprises:
 logging information about the data packet;
 updating the active scan based on the information about the data packet;
 making a fifth determination that the application migration operation is complete; and
 terminating the active scan and the connection based on the fifth determination.

18. The non-transitory computer readable medium of claim 16, wherein the third determination is based on at least one of the following:
 determining that a number of requests from a media access control address and internet protocol address associated with the data packet exceeds a threshold value;
 determining that a sequence number of an ACK request of the data packet is invalid based on a comparison with the sequence number and a stored sequence series;
 determining that a cross-site request forgery token is invalid; and
 determining that the data packet is associated with a known bad actor.

19. The non-transitory computer readable medium of claim 16, wherein the method further comprises:
 generating and causing to display, based on the first determination, an alert to a user that the data packet was rejected.

20. The non-transitory computer readable medium of claim 16, wherein the second determination is based on verifying flags, header fields, flag size, header field size, internet protocol version, packet checksum, flow control, TCP sequencing, source port, or destination port.

* * * * *